(12) United States Patent
Berthold et al.

(10) Patent No.: US 11,629,650 B2
(45) Date of Patent: Apr. 18, 2023

(54) PLANETARY GEARBOX

(71) Applicant: ROLLS-ROYCE plc, London (GB)

(72) Inventors: Martin Berthold, Dahlewitz (DE); Colin Young, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 17/651,918

(22) Filed: Feb. 22, 2022

(65) Prior Publication Data

US 2022/0282673 A1 Sep. 8, 2022

(30) Foreign Application Priority Data

Mar. 8, 2021 (GB) ..................................... 2103169

(51) Int. Cl.
*F16H 57/04* (2010.01)
*F02C 7/36* (2006.01)
*F16H 57/08* (2006.01)

(52) U.S. Cl.
CPC ............ *F02C 7/36* (2013.01); *F16H 57/043* (2013.01); *F16H 57/08* (2013.01); *F05D 2220/323* (2013.01); *F05D 2220/36* (2013.01); *F05D 2260/40311* (2013.01); *F05D 2260/98* (2013.01)

(58) Field of Classification Search
CPC .... F16H 57/043; F16H 57/08; F16H 57/0479; F16H 57/0427; F16H 1/2836; F16H 1/2809; F16H 1/48; F02C 7/36; F05D 2260/40311
See application file for complete search history.

(56) References Cited

U.S. PATENT DOCUMENTS

| 5,102,379 | A | 4/1992 | Pagluica et al. |
| 8,820,478 | B2 * | 9/2014 | Gauthier ................. F02C 3/107 184/6.12 |
| 10,767,755 | B2 * | 9/2020 | Nique ..................... F16H 57/08 |
| 2019/0162292 | A1 * | 5/2019 | Nique .................... F16H 1/2836 |

FOREIGN PATENT DOCUMENTS

| DE | 102017127874 A1 | 5/2019 | |
| DE | 202020104952 U1 * | 10/2020 | ............... F02C 7/06 |
| EP | 3290751 A1 * | 3/2018 | ............. F03D 15/00 |

OTHER PUBLICATIONS

Great Britain search report dated Sep. 2, 2021, issued in GB Patent Application No. 2103169.5.
European search report dated Jul. 7, 2022, issued in EP Patent Application No. 22155601.

* cited by examiner

*Primary Examiner* — Sherry L Estremsky
(74) *Attorney, Agent, or Firm* — Shumaker & Sieffert, P.A.

(57) ABSTRACT

A planetary gearbox having a sun gear, a plurality of planet gears, a ring gear, and a plurality of journal bearing pins. At its axially forward face side and/or at its axially rearward face side, each planet gear forms a recess that extends inside the planet gear starting from the face side. The planet gear forms a protrusion at its axially forward face side and/or at its axially rearward face side. The protrusion has an axial extent and a radial extent, wherein the radial extent is limited at the respective face side to the area between the planet gear inner bore and the radial inner limit of the respective recess in the planet gear, and wherein the protrusion is configured to provide for a flow path for oil emerging from the journal bearing that guides the oil away from the journal bearing.

16 Claims, 6 Drawing Sheets

PLANETARY GEARBOX

CROSS-REFERENCE TO RELATED APPLICATIONS

This specification is based upon and claims the benefit of priority from United Kingdom patent application number GB 2103169.5 filed on Mar. 8, 2021, the entire contents of which being incorporated herein by reference.

BACKGROUND

Technical Field

The present disclosure relates to a planetary gearbox.

Description of the Related Art

United States patent application US 2019/0162292 A1 discloses a planetary gearbox in which journal bearing pins are each located in a planet gear inner bore to form an oil-lubricated journal bearing with the planet gear. The planet gear comprises at its axially forward face side and at its axially rearward face side a recess or gear undercut that extends towards the mid-plane of the planet gear. Such recess is associated with the advantage of reducing the stiffness of the planet gear, wherein in the event that high forces occur at the ends of the journal bearing, the contact surface of the journal bearing formed by the planet gear can be elastically deformed.

On the other hand, oil flow emerging from the journal bearing between the journal bearing pin and the planet gear comprises a radial component that flows along the planet gear. In such cases where the planet gear comprises a recess at its face sides, oil may flow into such recess of the planet gear and accumulate in the recess. Accumulation of oil in such recess, however, is to be minimized as it leads to imbalance forces caused by an uneven distribution of the oil on the planet gears.

The problem underlying the present invention is to provide for a planetary gearbox containing a journal bearing between the journal bearing pins and the respective planet gears of the planetary gearbox, wherein the flow of oil from the journal bearing into a recess implemented in the planet gear is minimized.

There is a need for a planetary gearbox that solves the above problem or at least provides a useful alternative to known planetary gearboxes.

SUMMARY

According to an aspect of the invention, a planetary gearbox is provided which comprises a sun gear, a plurality of planet gears, a ring gear and a plurality of journal bearing pins. The sun gear is configured to rotate about a rotational axis of the planetary gearbox, wherein the rotational axis defines an axial direction of the planetary gearbox. The plurality of planet gears is driven by the sun gear, wherein each planet gear comprises an inner bore, an axially forward face side and an axially rearward face side. The ring gear is configured such that the planet gears mesh with the ring gear. The journal bearing pins are each located in an inner bore of each of the planet gears, wherein in each case a journal bearing pin and a planet gear form a journal bearing. At its axially forward face side and/or at its axially rearward face side each planet gear has a recess that extends towards the mid-plane of the planet gear.

It is provided that the planet gear forms a protrusion at its axially forward face side and/or at its axially rearward face side, the protrusion having an axial extent and a radial extent, wherein the radial extent is limited at the respective face side to the area between the planet gear inner bore and the radial inner limit of the respective recess in the planet gear, and wherein the protrusion is configured to provide for a flow path for oil emerging from the journal bearing that guides the oil away from the journal bearing in a direction having an axial component.

Aspects of the invention are thus based on the idea of providing a design feature in the form of a protrusion that minimizes the flow of oil into the recesses of the planet gear in that oil is guided away from the journal bearing in an axial direction (i.e., in a direction that comprises an axial component). This hinders the oil, when emerging out of the journal bearing, from flowing in a strictly radial direction and, thereby, straight into the respective recesses in the planet gear. Rather, by giving the initial flow path of the oil emerging from the journal bearing an axial direction, the likelihood that the oil will finally gather in the recesses in the planet gears, is highly reduced—or in the limit eliminated. This, in turn, reduces power losses and enhances gearbox reliability by mitigating the risk of imbalance forces caused by an uneven distribution of the oil on the planet gears. Moreover, control and guidance of the oil flow out of the journal bearing is improved.

The domain benefiting from such aspects of the invention is bounded by the planet carrier, the journal bearing pin and the planet gear. Oil supplied to the journal bearings for lubrication and cooling purposes emerges into such domain and mixes with the surrounding area. A complex two-phase oil flow pattern develops. Without the protrusions that the inventive concept provides for, there is an oil build-up in the recesses of the planet gear, this being detrimental to gearbox efficiency and reliability as previously described. When implementing protrusions in accordance with aspects of the invention, the oil flow will instead separate from the protrusion at an axial distance from the planet gear and travel radially outward in the axial space between the planet gear forward/rearward face side and the planet carrier. Also, some of the oil separating from the protrusion may reach the planet carrier, in which case it is guided from the planet carrier radially outward of the gearbox.

The feature that the radial extent of the protrusion is limited at the respective face side to the area between the planet gear inner bore and the radial inner limit of the respective recess in the planet gear means that the axially extending protrusion is limited at the respective face side to an area of the planet gear that is radially inboard of the axial forward recess and the axial rearward recess in the planet gear. This constraint is imposed as the protrusions shall not limit, or negatively effect, the function of the recesses and, accordingly, shall not extend into the recesses. At the same time, the radial extent of the protrusion at other axial positions, in particular at the outer end of the protrusion, is not necessarily limited to be radially inboard of the axial forward/rearward recess.

The protrusion that is formed at the axially forward face side of the planet gear extends axially forward towards the forward face of the carrier. The protrusion that is formed at the axially rearward face side of the planet gear extends axially rearwards towards the rear face of the carrier. In embodiments, the planet gear is formed in a symmetrical manner, wherein a protrusion and a recess are present both at the axially forward face side and at the axially rearward face side of the planet gear. In other embodiments, a non-symmetrical arrangement may be chosen. For example, it may be provided that the protrusions at the forward face side and at the rearward face side are non-symmetrical with respect to the mid-plane. Further, it may be provided that both the recesses and the protrusions at the forward face side and at the rearward face side are non-symmetrical with respect to the mid-plane.

The planetary gearbox may be in a star configuration (wherein the ring gear is rotating) or a planetary configuration (wherein the ring gear is fixed). In the case of a star configuration, the benefit of avoiding potential imbalance forces due to an uneven distribution of the oil on the planet gear is no longer applicable. As there is no orbiting motion, the resultant centrifugal force with respect to the planet gear axis is constant. However, the benefit for reduced power losses associated with aspects of the invention still applies.

According to an aspect of the invention, the protrusion has a radially inner underside, a radially outer top side, and an axially outer end forming a transition between its underside and the top side, wherein the underside of the protrusion provides for an initial flow path of the oil emerging from the journal bearing.

It is pointed out that when referring to a "top" or "bottom" surface or side in this disclosure, reference is made to a cross-sectional view of the planet gear or planetary gearbox. The language "top" and "bottom" corresponds to "outboard" and "inboard" in the actual 3D geometry.

As previously discussed, by giving the initial flow path of the oil emerging from the journal bearing an axial direction by means of a protrusion, the likelihood that the oil will finally gather in the recesses in the planet gears is highly reduced. This is particularly the case if, additionally, a design feature for creating a defined edge for oil separation from the planet gear is provided. Such defined edge for oil separation is provided at the axially outer end of the protrusion. At the axially outer end of the protrusion, the oil flow—or at least a part of the oil flow—separates from the planet gear, thereby limiting the oil film thickness on the planet gear and the amount of oil accumulating in the planet gear recesses. The oil that separates from the planet gear may then be guided by the planet carrier in a radially outboard direction and/or travel radially outward in the axial space between the planet gear forward/rearward face side and the planet carrier.

In a further embodiment, the underside of the protrusion comprises a sloped—or conical—surface extending at an angle with respect to the axial direction. A sloped surface is associated with the advantage that, during operational rotation of the planet gear, oil present at the sloped surface experiences a force component which is parallel to the inner surface of the protrusion, thereby actively driving the oil away from the journal bearing and towards the adjacent carrier surface.

In an embodiment, the underside of the protrusion may comprise two sloped surfaces, a first sloped surface adjacent to the journal bearing and a second sloped surface adjacent to the first sloped surface, wherein the first sloped surface is more angled with respect to the axial direction than the second sloped surface. For example, the first sloped surface may extend, in a sectional view of the planet gear, at an angle to the axial direction which lies in the range between 30° and 60°, and the second sloped surface may extend, in a sectional view of the planet gear, at an angle to the axial direction which lies in the range between 5° and 25°. The first sloped surface serves to gather and evacuate oil from the immediate vicinity of the journal bearing and provides a chamfer for easier assembly and the second sloped surface serves to guide the oil away from the journal bearing and the planet gear more generally.

In another embodiment, the underside of the protrusion is formed by a single sloped surface, wherein the single sloped surface may extend at an angle to the axial direction which lies in the range between 30° and 60° and amounts to, e.g., 45°. The end of the sloped surface defines an oil separation point. In this embodiment, a nose-type form of the protrusion is provided for.

In another embodiment, the axially outer end of the protrusion is in the form of a hook-like projection that extends in an outboard radial direction, the hook-like projection comprising an outer surface that extends radially. In an embodiment, the hook-like projection forms a top surface which extends at right angles to the radially extending outer surface of the hook-like projection. The edge between the top surface and the radially extending outer surface defines an effective oil separation edge. Generally, oil separation is along an edge. When referring to an oil separation point, reference is made to a cross-sectional view of the planetary gearbox.

In a further embodiment, the top side of the protrusion comprises a groove configured to avoid oil flowing in an axial direction towards the recess in the planet gear. Such a groove provides for another feature that hinders oil to flow into the recess of the planet gear. In an embodiment, the groove comprises a groove side wall that runs perpendicular to the top surface of the hook-like projection. The edge formed between the top surface of the projection and the groove side wall represents another oil separation feature. Further, oil may separate from the top surface of the projection.

In a further embodiment, the sloped surface of the protrusion underside merges into the radially extending outer surface of the projection in a lower corner area of the protrusion, which may be radiused, thereby providing for a smooth merger from the underside to the hook-like projection.

In a further embodiment, the underside of the protrusion comprises a sloped surface and an axially extending surface, wherein the sloped surface is adjacent the journal bearing. In such case, the axially outer end of the protrusion may be formed by a rectangular structure (in sectional view). A lip-type form of the protrusion is provided for.

In a further embodiment, the underside of the protrusion comprises an inner groove that is formed adjacent to a sloped surface, wherein the sloped surface is adjacent the journal bearing. Such inner groove provides for another feature that hinders the flow of oil along the planet gear. It may be provided that the axially outer end of the protrusion is formed by a radially inward pointing hook, wherein the hook is adjacent the inner groove. Accordingly, in this embodiment, a groove-type or inverted hook-type form of the protrusion is provided for.

In a further embodiment, the recess at the axially forward face side and/or the recess at the axially rearward face side in the planetary gear comprises a radially outer surface that is inclined at an angle larger than 0° with respect to the axial direction. By providing a sloped surface inside the recess, oil does not accumulate inside the recess but, by means of the rotation of the planet gear, is driven out of the recess. This provides for another feature to avoid accumulation of oil in the recesses of the planet gear.

The protrusion may extend over 360° in the circumferential direction of the planet gear. The planet gear may be rotationally symmetric.

The protrusion may be formed in one piece with the other parts of the planet gear. Alternatively, it may be formed by a separate part connected to the planet gear.

In a further aspect of the invention, a gas turbine engine is provided. The gas turbine engine comprises:

an engine core comprising a turbine, a compressor, and a core shaft connecting the turbine to the compressor;

a fan located upstream of the engine core, the fan comprising a plurality of fan blades; and a planetary gearbox in accordance with claim 1 that receives an input from the core shaft and outputs drive to the fan so as to drive the fan at a lower rotational speed than the core shaft.

In an embodiment, the turbine is a first turbine, the compressor is a first compressor, and the core shaft is a first core shaft. The engine core further comprises a second turbine, a second compressor, and a second core shaft connecting the second turbine to the second compressor, wherein the second turbine, the second compressor, and the second core shaft are arranged to rotate at a higher rotational speed than the first core shaft.

It should be noted that the present invention is described in terms of a cylindrical coordinate system having the coordinates x, r and φ. Here x indicates the axial direction, r the radial direction and φ the angle in the circumferential direction. The axial direction is defined by the machine axis of the gas turbine engine in which the present invention is implemented, with the axial direction pointing from the engine inlet to the engine outlet. The axial direction of the planetary gearbox is identical to the axial direction of the gas turbine engine. Starting from the x-axis, the radial direction points radially outwards. Terms such as "in front of" and "behind" refer to the axial direction or flow direction in the engine. Terms such as "outer" or "inner" refer to the radial direction.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The, or each, compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The, or each turbine, (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centerline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity Utip. The work done by the fan blades 13 on the flow results in an enthalpy rise dH of the flow. A fan tip loading may be defined as dH/Utip2, where dH is the enthalpy rise (for example the 1-D average enthalpy rise) across the fan and Utip is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being Jkg−1K−1/(ms−1)2). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 Nkg−1s, 105 Nkg−1s, 100 Nkg−1s, 95 Nkg−1s, 90 Nkg−1s, 85 Nkg−1s or 80 Nkg−1s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials.

For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminum based material (such as an aluminum-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminum based body (such as an aluminum lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55° C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

The invention will be explained in more detail on the basis of exemplary embodiments with reference to the accompanying drawings in which.

DETAILED DESCRIPTION

Aspects and embodiments of the present disclosure will now be discussed with reference to the accompanying figures. Further aspects and embodiments will be apparent to those skilled in the art.

Figure 1:
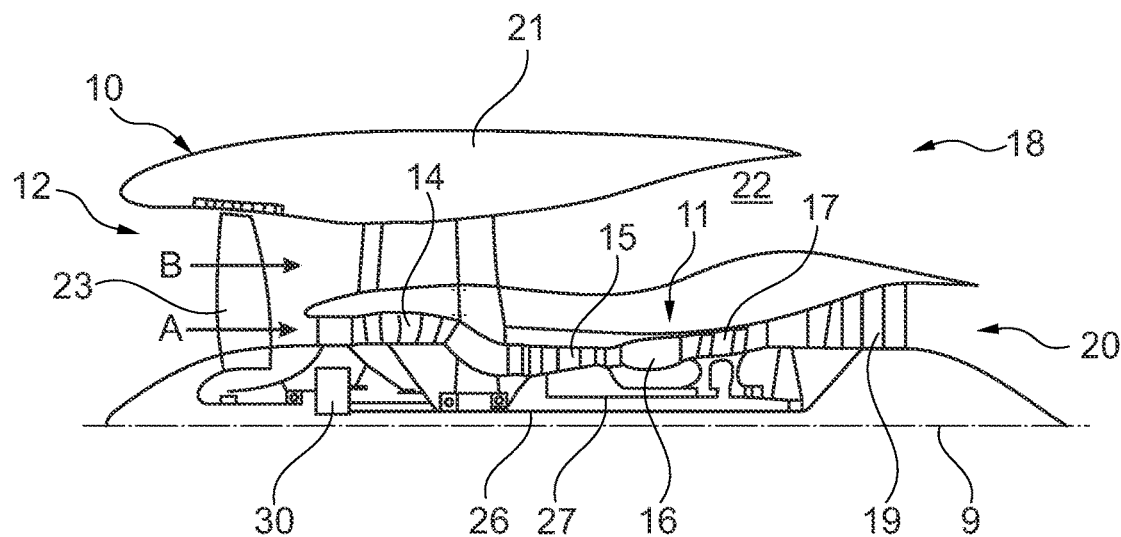
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises an engine core 11 that receives the core airflow A. The engine core 11 comprises, in axial flow series, a low-pressure compressor 14, a high-pressure compressor 15, combustion equipment 16, a high-pressure turbine 17, a low-pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low-pressure turbine 19 via a shaft 26 and an epicyclic gearbox 30.

In use, the core airflow A is accelerated and compressed by the low-pressure compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high-pressure and low-pressure turbines 17, 19 before being exhausted through the nozzle 20 to provide some propulsive thrust. The high-pressure turbine 17 drives the high-pressure compressor 15 by a suitable interconnecting shaft 27. The fan 23 generally provides the majority of the propulsive thrust. The epicyclic gearbox 30 is a reduction gearbox.

Figure 2:
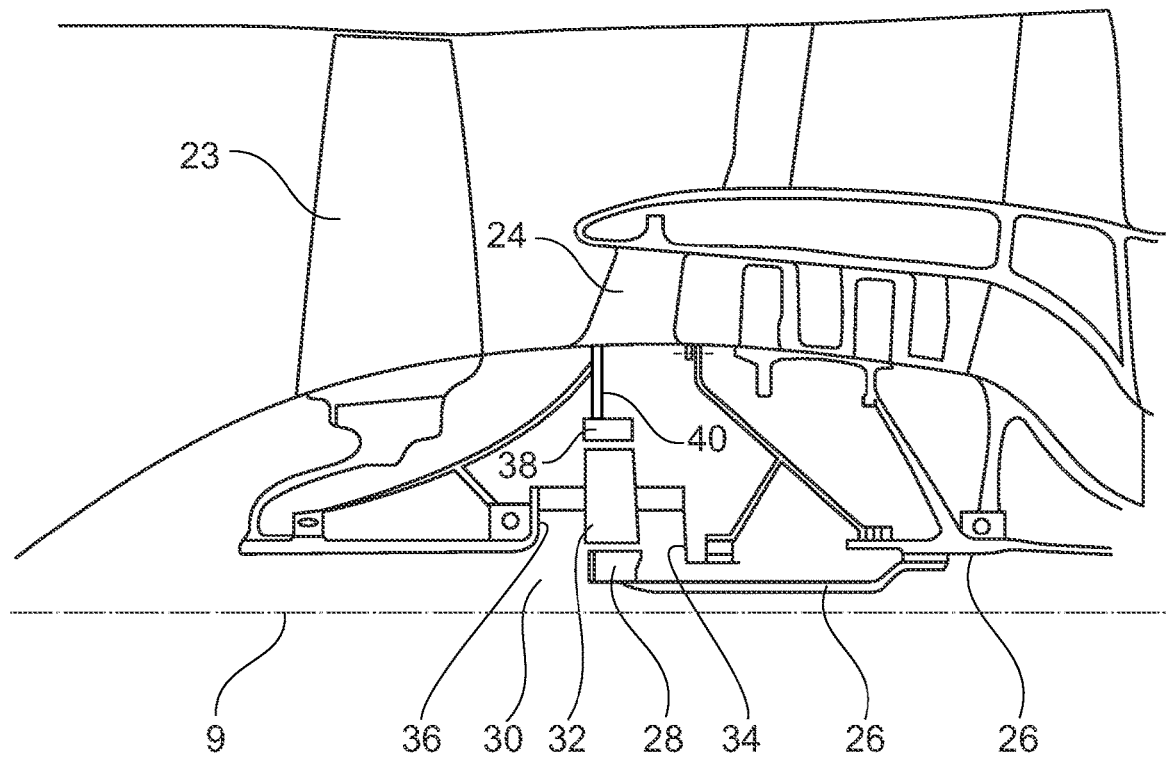
FIG. 2 is a close up sectional side view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun wheel, or sun gear, 28 of the epicyclic gearbox 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low-pressure turbine" and "low-pressure compressor" as used herein may be taken to mean the lowest pressure turbine stages and lowest pressure compressor stages (i.e. not including the fan 23), respectively, and/or the turbine and compressor stages that are connected together by the interconnecting shaft 26 with the lowest rotational speed in the engine (i.e. not including the gearbox output shaft that drives the fan 23). In some literature, the "low-pressure turbine" and "low-pressure compressor" referred to herein may alternatively be known as the "intermediate-pressure turbine" and "intermediate-pressure corn pressor". Where such alternative nomenclature is used, the fan 23 may be referred to as a first, or lowest pressure, compression stage.

Figure 3:
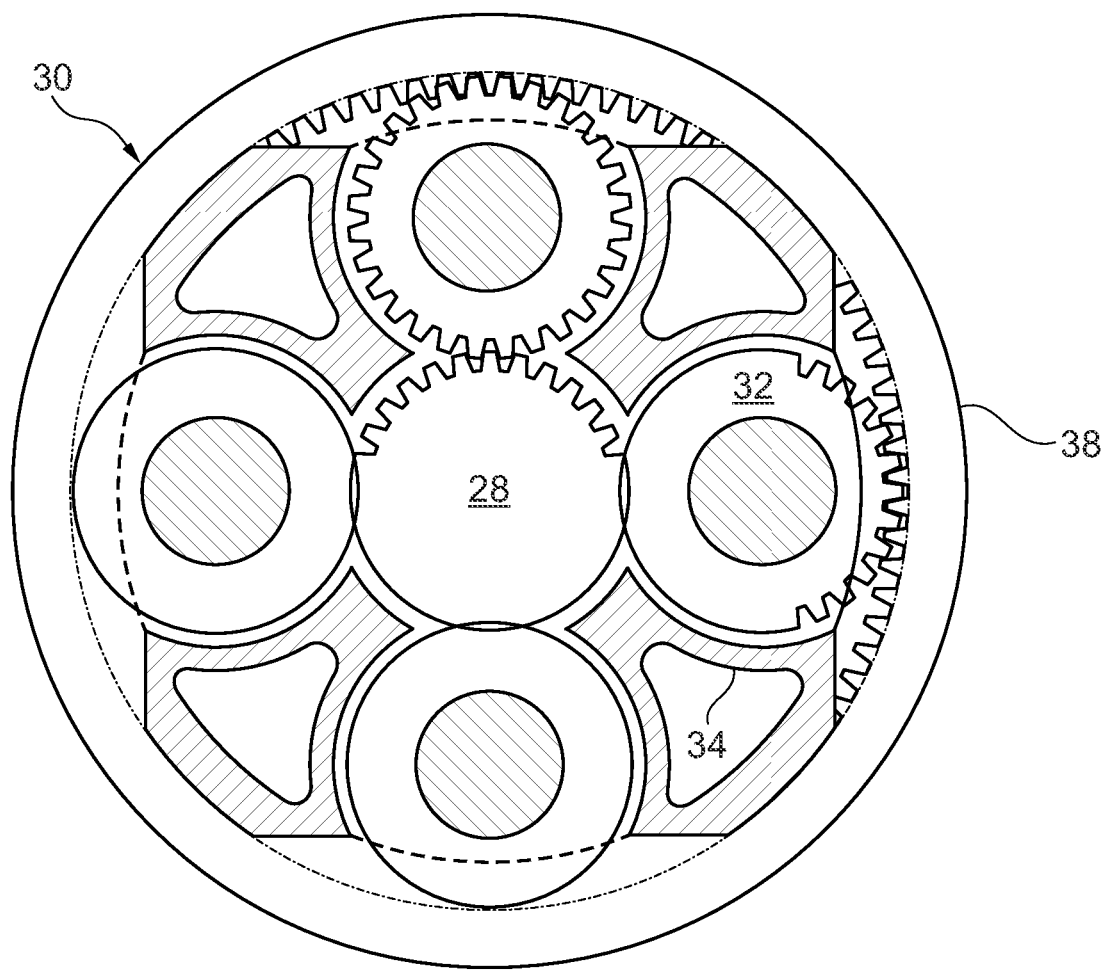
FIG. 3 is a partially cut-away view of an epicyclic gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure.

Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate-pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
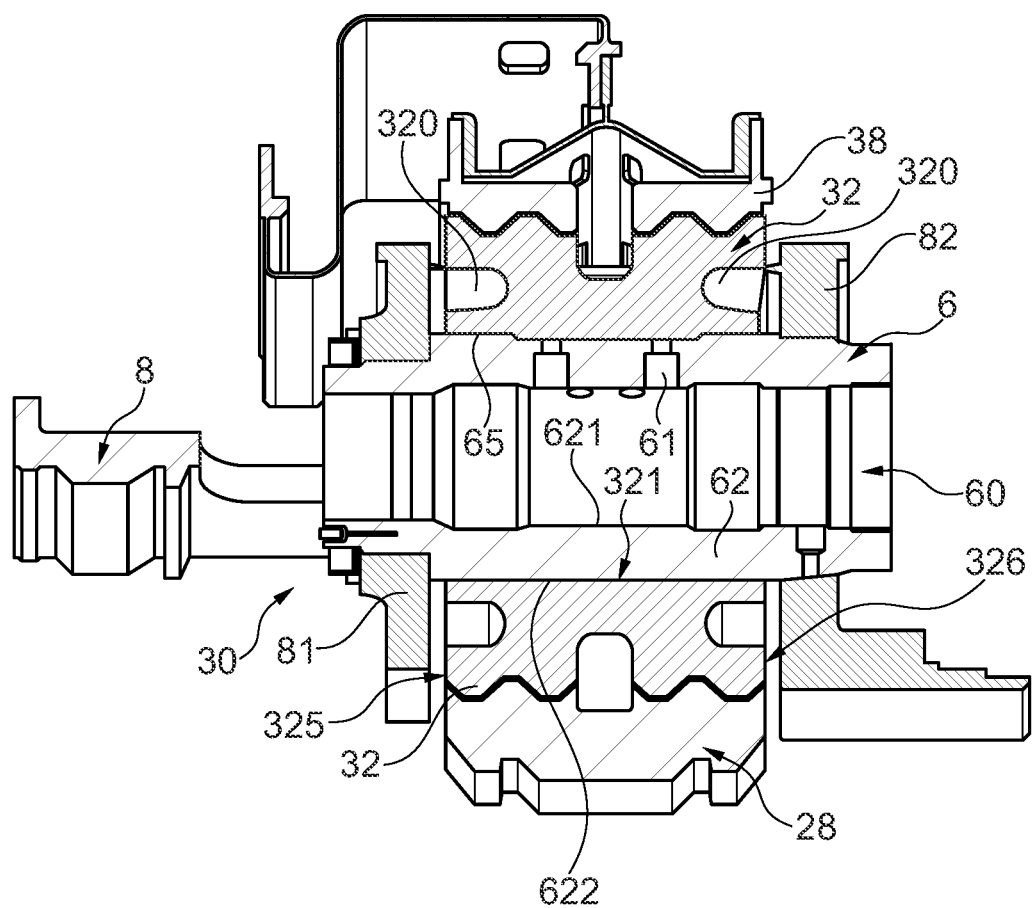
FIG. 4 is a sectional side view of an example of a planetary gearbox, the gearbox comprising planet gears with recesses at their front and rear face sides.

FIG. 4 shows an example of a planetary gearbox 30 of a gas turbine engine in a sectional view. The planetary gearbox 30 comprises a sun gear 28 which is driven by a sun shaft or drive shaft (not shown). The drive shaft is the shaft 26 of FIGS. 1 and 2 or generally a turbine shaft. The sun gear 28 and the drive shaft rotate about the axis of rotation 9 (see FIG. 1). The axis of rotation of the planetary gearbox 30 is identical to the axis of rotation of the gas turbine engine.

The planetary gearbox 30 includes a plurality of planet gears 32, one of which is shown in the sectional view of FIG. 4. The sun gear 28 drives the planet gear 32, whereby a toothing of the sun gear 28 meshes with a toothing of the planet gear 32.

The planet gear 32 is hollow cylindrical and forms an outer surface and an inner surface. The planet gear 32 rotates—driven by the sun gear 28—around an axis of rotation which runs parallel to the axis of rotation of the planetary gearbox. The outer circumferential surface of the planet gear 32 forms a toothing which meshes with the toothing of a ring gear 38. The ring gear 38 is fixed, i.e., non-rotating. In other embodiments, the ring gear may be rotating, while the planet gears are fixed in their position in the gearbox. The planet gears 32 rotate due to their coupling with the sun gear 28 and travel along the circumference of the ring gear 38. The rotation of the planet gears 32 along the circumference of the ring gear 38 and around the axis of rotation 9 is slower than the rotation of the drive shaft, providing a reduction ratio.

The planet gear 32 has a central axial opening or bore 321 adjacent to its inner circumferential surface. A journal bearing pin 6 is inserted into the bore 321, which itself also has an axial bore 60, whereby the journal bearing pin 6 and the planetary gear 32 form a journal bearing 65 on their facing surfaces. The journal bearing pin 6 forms a wall 62 which has an inner surface 621 and an outer surface 622, the inner surface 621 defining the axial bore 60 and the outer surface 622 forming part of the journal bearing 65.

Further, recesses 320, which may also be referred to as gear undercuts, are implemented in the planet gear 32. More particularly, a first recess 320 is formed at the axially forward face side 325 of the planet gear, wherein the first recess 320 extends inside the planet gear 32 starting from the axially forward face side 325. Further, a second recess 320 is formed at the axially rearward face side 326 of the planet gear, wherein the second recess 320 extends inside the planet gear 32 starting from the axially rearward face side 326.

FIG. 4 also shows a front carrier plate 81 and a rear carrier plate 82. The journal bearing pin 6 is fixedly attached to the front carrier plate 81 and to the rear carrier plate 82, for example screwed or welded to them. The front carrier plate 81 is connected to a torque carrier 8 which may be coupled to a fan shaft.

To lubricate the bearing 65 between the journal bearing pin 6 and planet gear 32, an oil supply device is provided which comprises an oil supply channel (not shown) through which oil from a circulating oil system is fed into lubrication film openings 61 in journal bearing pin 6. A plurality of variants exists of how oil of the circulating oil system may be provided to the journal bearing 65. The oil serves to lubricate the journal bearing 65 and also serves to cool the journal bearing 65.

In the context of the present invention, efficient scavenging and quick removal of the oil flow emerging from the journal bearing is of relevance.

Figure 5:
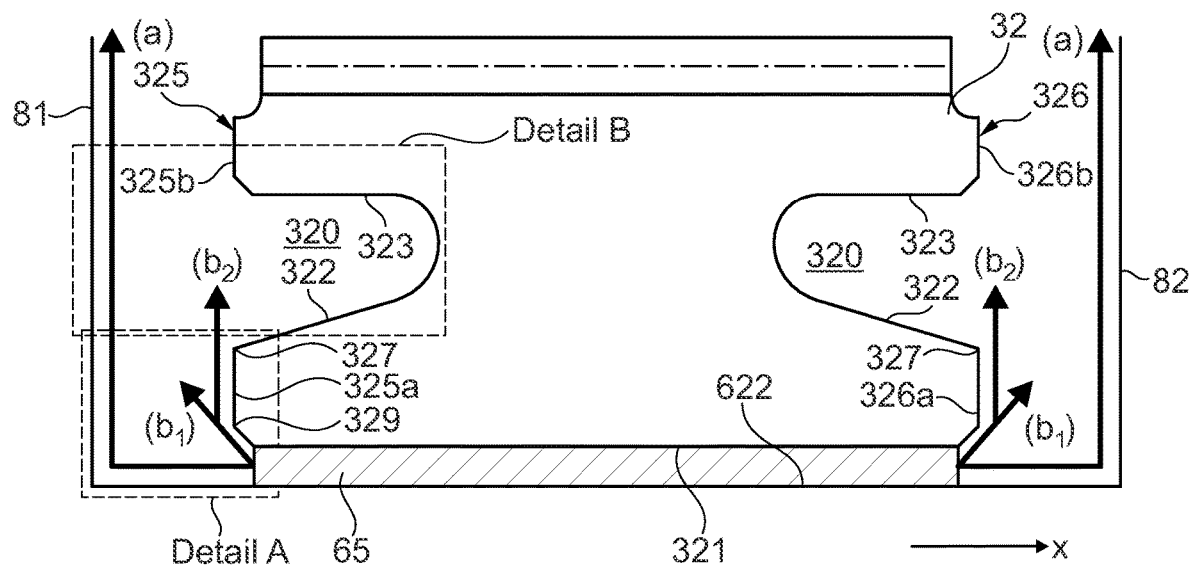
FIG. 5 is a sectional view of an example planet gear, wherein details A and B depict areas of the planet gear in which design changes relating to the present invention are implemented in accordance with FIGS. 6 and 7.

FIG. 5 depicts a planet gear 32 of the planetary gearbox not formed in accordance with the principles of the present invention. The planet gear 32 may be a planet gear 32 of the planetary gearbox of any of FIGS. 1 to 4. As discussed with respect to FIG. 4, recesses 320 are formed in the axially forward face side 325 and in the axially rearward face side 326. The planet gear 32 forms a journal bearing 65 which is formed between the central bore 321 of the planet gear 32 and the outer surface 622 of the journal bearing pin 6. The journal bearing 65, which is not depicted true to scale for illustration purposes, contains oil for lubrication and cooling that is provided, e.g., through openings in the journal bearing pin as discussed with respect to FIG. 4. The oil emerges from the journal bearing 65 at both axial ends.

Regarding the structure of the recesses 320 formed in the planet gear 32, the following is pointed out. The axially forward face side 325 is formed by an axially forward inner face side 325a extending radially inward (inboard) from the recess 320 and an axially forward outer face side 325b extending radially outward (outboard) from the recess 320. The inner face side 325a forms an edge 327 at the transition to the recess 320. The recess 320 forms an inclined inner surface 322 and an outer surface 323 parallel to the gear's axis of rotation, the outer surface 323 ending at the outer face side 325b. In a similar manner, the axially rearward face side 326 comprises an axially rearward inner face side 326a and an axially rearward outer face side 326b. In the depicted embodiment, the respective inner face sides 325a, 326a and outer face sides 325b, 326b are arranged in the same plane. However, this is not necessarily the case. The inner part of the planet gear 32 which forms the inner face sides 325a, 326a may be referred to as gear base.

Oil emerges from the journal bearing 65 in a plurality of outflow directions and corresponding flow paths. FIG. 5 shows flow paths (a), (b1) and (b2) of the oil leaving the lubricating gap. Axial oil outflow follows flow path (a). Radial oil outflow follows the extremes of either flow path (b1) or (b2). In order for the oil to follow flow path (b1), its linear momentum must be sufficiently high to cause flow separation from a lower edge 329 of the gear base. If that is the case, the various forces acting on the oil film at this location will cause a deflection of the film away from the gear chamfer surface. If the oil flow does not separate from the lower edge 329 of the gear base, it will remain attached to the planet gear 32 and follow its contour until it may separate from the upper edge 327 of the gear base.

However, two problems arise when considering flow path (b2). First, flow path (b2) is very close to recess 320 such that there is a risk that at least part of the flow path (b2) flows into recess 320. Second, flow path (b2) may not separate at all from upper edge 327 in which case it continues to directly flow into recess 320. This is similarly true both for the front face side 325 and the rear face side 326 of the planet gear 32. Accordingly, there is a risk that oil accumulates in recesses 320. Such accumulation of oil during operation may cause imbalance forces and increased power losses in a planetary configuration and increased power losses in a star configuration.

Figure 6:
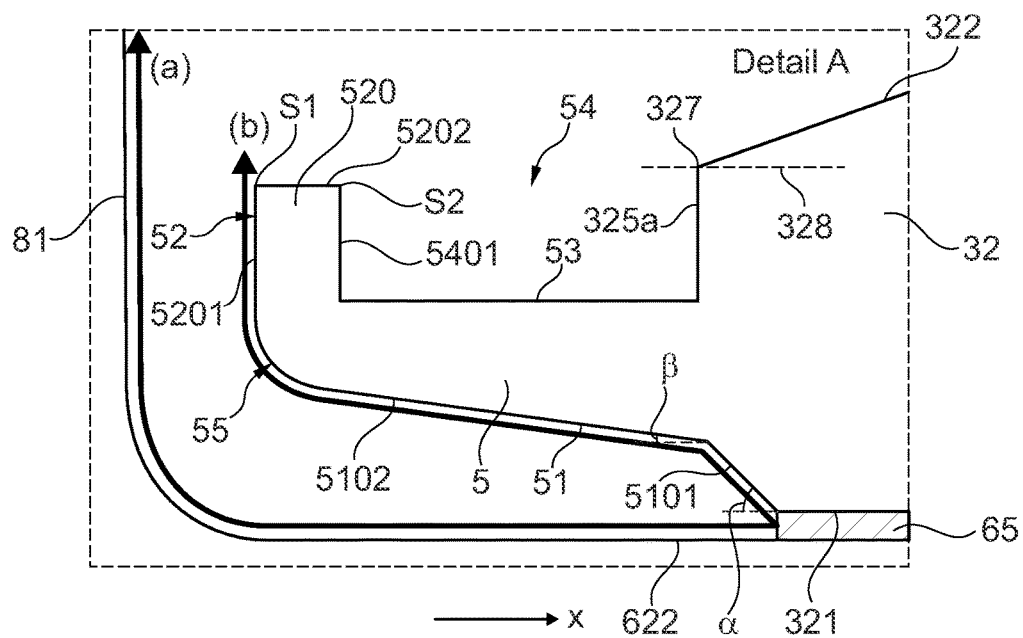
FIG. 6 shows detail A of the planet gear of FIG. 5 implementing an axially extending protrusion of the planet gear for guiding oil away from the journal bearing.

FIG. 6 shows an embodiment of a planet gear 32 in which the above described problem is mitigated by the provision of a protrusion 5 at the axially forward face side 325, namely, the axial forward inner face side 325a of the planet gear 32. In a similar manner, a protrusion 5 can be provided at the axially rearward inner face side 326a. The protrusion 5 has an axial extent and a radial extent. The axial extent extends from the inner face side 325a. The radial extent at the inner face side 325a is limited to the area between the planet gear inner bore 321 and the radial inner limit 328 of recess 320, wherein the radial position of radial inner limit 328 is defined by the radial position of edge 327 located at the transition to inclined inner surface 322 of recess 320.

The protrusion 5 comprises a radially inner underside 51, a radially outer top side 53, and an axially outer end 52 which forms the transition between the underside 51 and the top side 53. The radial extent of the protrusion 5 at the outer end 52 is not necessarily limited to the radial inner limit 328. It may, e.g., extend about half the distance between the planet gear inner bore 321 and the planet gear tip diameter.

As shown in FIG. 6, the underside 51 of protrusion 5 provides the initial flow path (b) for some of the oil that emerges from the journal bearing 65. By means of protrusion 5, the oil of flow path (b) is guided away from the journal bearing 65 in a direction which is primarily an axial direction and which at least has an axial component. Thereby, the oil is axially displaced with respect to recess 320, thereby reducing the risk of oil entering and accumulating in the recess 320.

Another, axial flow path (a) of oil emerges from the journal bearing 65 strictly axially. The oil passing along the axial flow path (a) impinges on planet carrier 81 and is guided by planet carrier 81 in a radial direction. As it is guided by planet carrier 81, there is no concern of oil following axial flow path (a) entering recess 320.

The underside 51 of the protrusion 5 forms two sloped surfaces 5101, 5102, wherein a first sloped surface 5101 is formed adjacent the journal bearing 65 and a second sloped surface 5102 is formed adjacent the first sloped surface 5101. The first sloped surface 5101 is more angled with respect to the axial direction than the second sloped surface 5102. More particularly, the first sloped surface 5101 extends at an angle α to the axial direction which lies in the range between 30° and 60° and may be 45°. The second sloped surface 5102 extends at an angle β to the axial direction which lies in the range between 5° and 25° and may be 10°.

The outer end 52 of the protrusion 5 is in the form of a hook-like projection 520. The hook-like projection 520 extends in the radially outward direction, forming an outer surface 5201 extending radially and a top surface 5202 extending at right angles to the outer surface 5201. The sloped surface 5102 of the underside 51 merges into the radially extending outer surface 5201 in a lower corner area 55 of the protrusion 5 which comprises a radius.

The top side 53 of the protrusion forms a groove 54, wherein one of the side walls 5401 of the groove 54 runs perpendicular to the top surface 5202 of the hook-like projection 520. The other side wall of the groove 54 is formed by the remainder of the axially forward inner face side 325*a*.

The described structure of protrusion 5 provides for a plurality of measures that prevent or mitigate the risk that oil from journal bearing 65 accumulates in recess 320. First, a first oil separation edge S1 is formed between outer surface 5201 and the top surface 5202. At oil separation edge S1, the oil or part of the oil of flow path (b) may separate from the planet gear 32. If the various forces acting on the oil at oil separation edge S1 cause a deflection of the film away from the edge, oil separation occurs.

A second oil separation edge S2 is formed between the top surface 5202 of hook-like projection 520 and the side wall 5401 of groove 54 on the top side 53 of protrusion 5. At oil separation edge S2, oil that did not separate at separation edge S1 may separate due to the fact that, in order to continue along the outside surface of the planet gear 32, the oil would have to flow in an inboard direction, opposing the large centrifugal force acting on the oil due to the rotation of the planet gear.

As a third measure to prevent the flow of oil into recess 320, the groove 54 is provided. The groove 54, because of separation edge S2 and groove side wall 5401, hinders oil from flowing in an axial direction towards the recess 320 in the planet gear 32.

Oil that separates from planet gear 32 between and including separation edge S1 or separation edge S2 may travel radially outward in the axial space between the planet gear face side 325 and the planet carrier 81. Parts of the oil may be in the form of an oil mist.

The embodiment of FIG. 6 provides for a protrusion of the gear base and creates at the protrusion defined edges for oil separation if the oil follows flow path (b). The protrusion 5 protrudes into the gap between the planet carrier 81 and the planet gear 32, thereby minimizing interactions between the separating oil, the planet carrier 81 and the planet gear 32. This minimizes load-independent power losses generated by oil emerging from the lubricating gap of the journal bearing 65, thereby increasing gearbox efficiency. Minimizing the interactions of the oil with the domain boundaries, namely, the journal bearing pin 6, the planet carrier 81 and the planet gears 32 further reduces oil atomization. Reducing oil atomization, in turn, reduces the mean density of the air/oil medium through which the gear system rotates. This leads to a reduction in load-independent windage power losses. Minimizing the volume of atomized oil in the mentioned domain further reduces engine oil consumption as oil in a continuous state, e.g., film or sheet, can be scavenged and separated more effectively than oil which is highly dispersed in air.

Using sloped or conical surfaces 5101, 5102 in the embodiment of FIG. 6 rather than horizontal or cylindrical surfaces is associated with the advantage that, during operation, centrifugal forces of different magnitudes act on the oil which is in contact with the rotating surface of the planet gear. Using a sloped or conical surface instead of a horizontal or cylindrical one will generate a force component which acts parallel to the surface. Accordingly, during operation oil is actively driven along the underside 51 of the protrusion 5 and towards the domain outlet. This helps to minimize the oil film thickness on these surfaces and thus reduces the load-independent power losses due to accelerating a smaller amount of oil.

Figure 7:
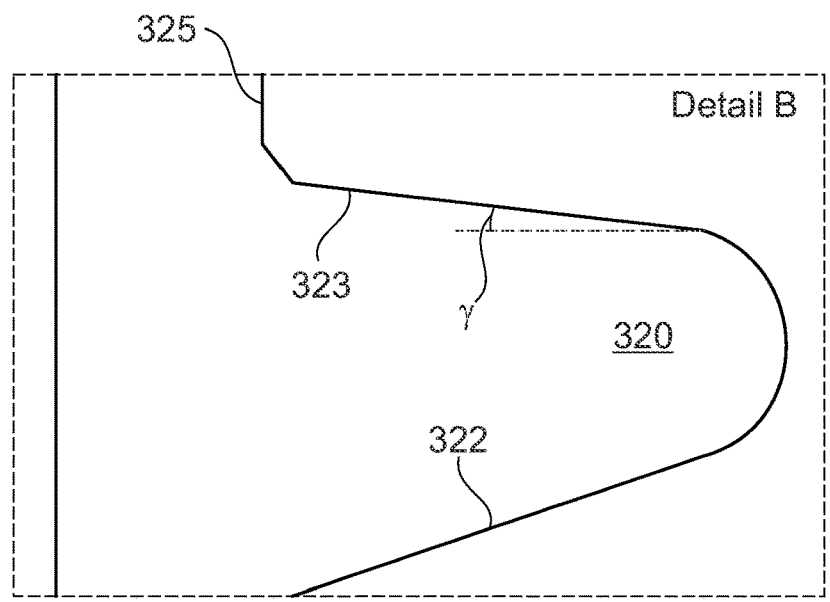
FIG. 7 shows detail B of the planet gear of FIG. 5 implementing a sloped upper surface in a recess of the planet gear.

FIG. 7 shows detail B of FIG. 5, wherein detail B is a design change compared to the depiction of FIG. 5. According to detail B, the upper or radially outer surface 323 of recess 320 at the axially forward face side 325 is inclined at an angle γ with respect to the axial direction, wherein the angle γ is larger than zero such that the outer surface 323 is inclined radially outwards. This allows oil that, despite the described measures, accumulates in recess 320, to be driven outside of recess 320 along outer surface 323 due to the rotation of the planet gear 32. In a similar manner, the radially outer surface 323 may be inclined in the recess 320 at the axially rearward face side 326 of the planet gear 32. In this respect, it is pointed out that in a planetary gearbox, the resultant centrifugal force acting on an oil droplet/film on the planet gear is a combination of the centrifugal force generated by the planet gear rotation itself and the centrifugal force induced by the planet carrier rotation. The resultant centrifugal force on an oil droplet/film on the planet gear will vary depending on its circumferential position on the planet gear with respect to the planet gear axis. Consequentially, the oil film thickness in the recess 320 will vary around the planet gear's circumference. An uneven oil film thickness distribution in recess 320 may lead to imbalance forces. Sloped or conical surfaces such as surface 323 of FIG. 7 instead of horizontal or cylindrical once will mitigate potential imbalance forces by minimizing the accumulated oil film thickness.

Figure 8:
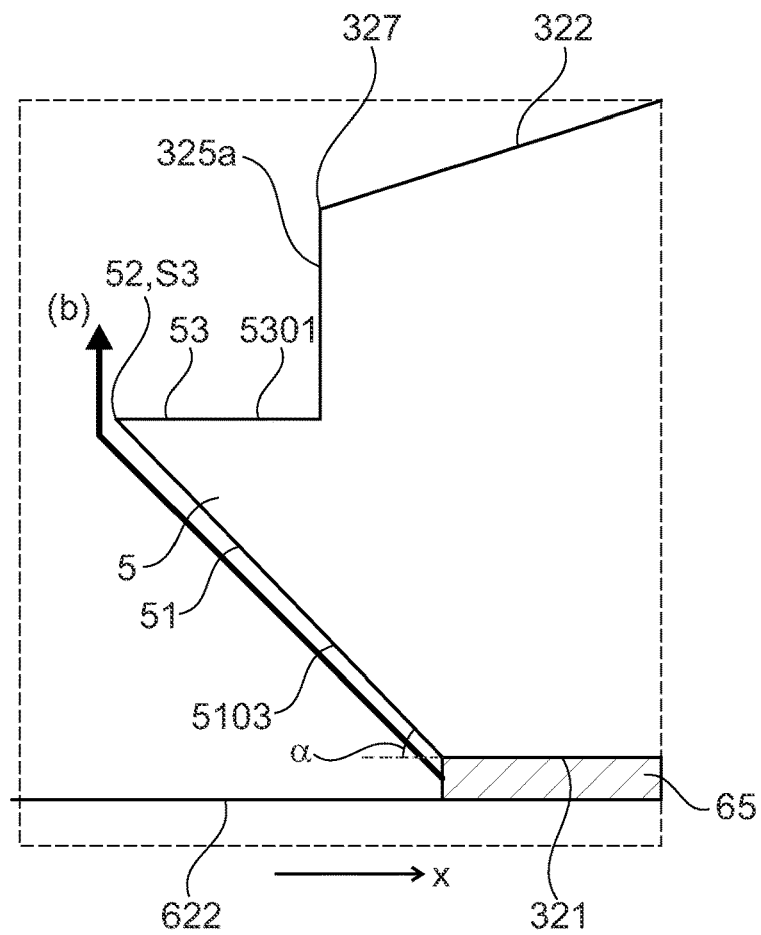
FIG. 8 shows a further embodiment of a planet gear forming a journal bearing with a journal bearing pin and having an axially extending protrusion for guiding oil away from the journal bearing and clear of the outboard planet gear recess.

FIG. 8 shows a further embodiment of a planet gear 32 implementing a protrusion 5. In the embodiment of FIG. 8, the underside 51 of the protrusion 5 is formed by a single sloped surface 5103 which extends at an angle α with respect to the axial direction which lies in the range between 30° and 60° such as 45° (degrees). The axially outer end 52 of the protrusion 5 is formed by a single edge S3, the edge S3 forming an oil separating edge for flow path (b). The top side 53 of the protrusion of FIG. 8 is formed by a surface 5301 that extends in the axial direction. Surface 5301 is at right angles with the remainder of axially forward face inner side 325a. In the embodiment of FIG. 8, the protrusion forms a nose.

Figure 9:
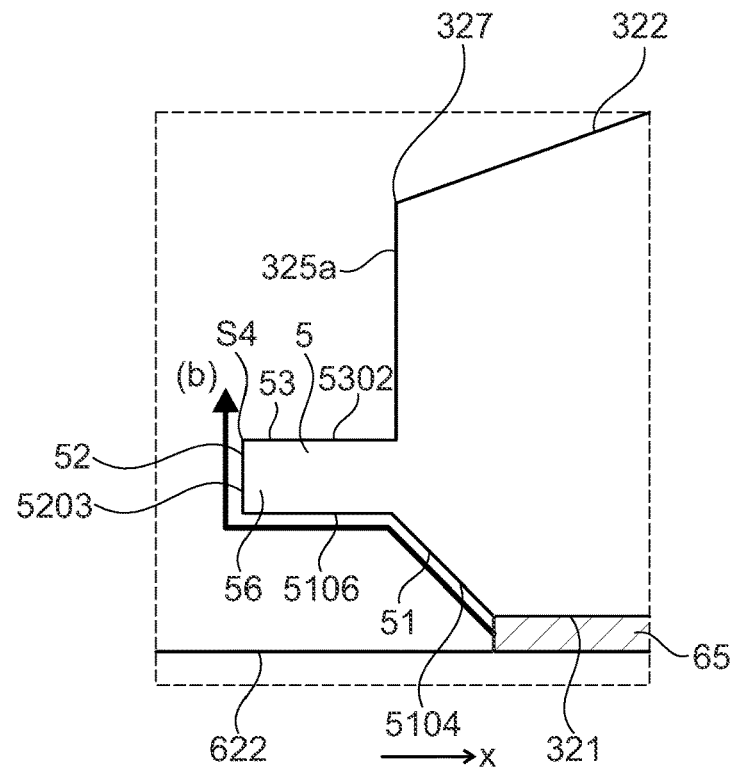
FIG. 9 shows a further embodiment of a planet gear forming a journal bearing with a journal bearing pin and having an axially extending protrusion for guiding oil away from the journal bearing and clear of the outboard planet gear recess.

FIG. 9 shows a still further embodiment of a planet gear 32 implementing a protrusion 5. In the embodiment of FIG. 9, the underside 51 of the protrusion 5 is formed by a sloped surface 5104 which is formed adjacent to the journal bearing 65 and an axially extending surface 5106 which is formed adjacent the sloped surface 5104. The axially outer end 52 of protrusion 5 is formed by a radially extending surface 5203. The radially outer top side 53 of protrusion 5 is formed by an axially extending surface 5302 such as in the embodiment of FIG. 8. Accordingly, in the sectional view of FIG. 9, the protrusion 5 forms a rectangular structure 56 having two axially extending surfaces 5106, 5302 displaced to each other in the radial direction. In the embodiment of FIG. 9, the protrusion 5 forms a circumferential lip.

An oil separating edge S4 for flow path (b) is formed between radially extending surface 5203 and axially extending surface 5302.

Figure 10:
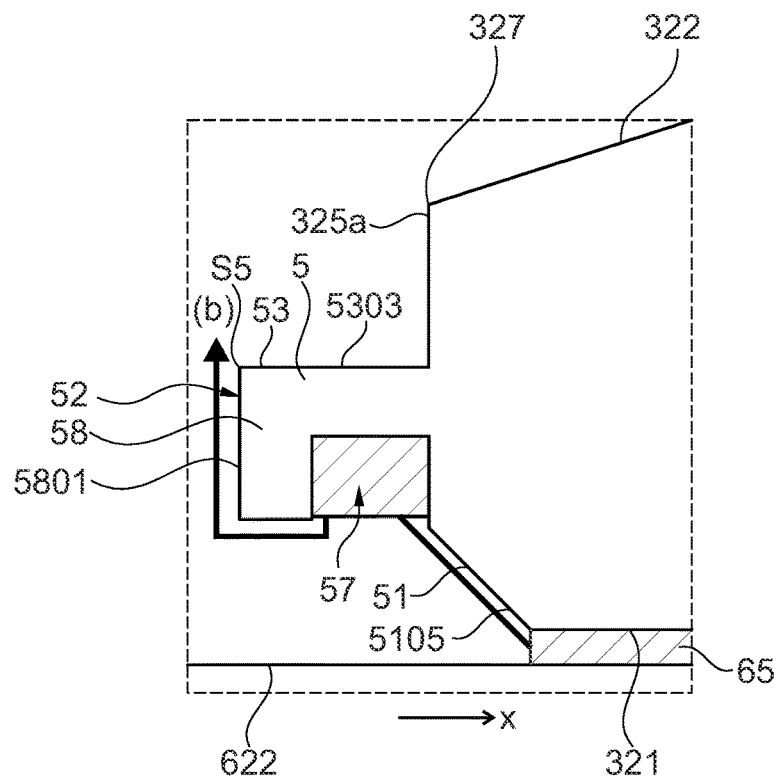
FIG. 10 shows a further embodiment of a planet gear forming a journal bearing with a journal bearing pin and having an axially extending protrusion for guiding oil away from the journal bearing and clear of the outboard planet gear recess.

FIG. 10 shows a still further embodiment of a planet gear 32 implementing a protrusion 5. In the embodiment of FIG. 10, the underside 51 of the protrusion 5 comprises a sloped surface 5105 which is formed adjacent to the journal bearing 65 and an inner groove 57 which is formed adjacent the sloped surface 5105. At the same time, the axially outer end 52 of protrusion 5 forms a radially inward pointing hook 58 formed next to inner groove 57, the inward pointing hook 58 comprising an outer surface 5801 that extends radially. The outer top side 53 is formed by an axially extending surface 5303. In the embodiment of FIG. 10, the protrusion 5 forms a circumferential groove-type feature or inverted hook-type of feature.

An oil separating edge S5 for flow path (b) is formed between radially extending surface 5801 and axially extending surface 5303.

It is pointed out that in the disclosed embodiments a protrusion 5 has been discussed that extends axially at the forward face side 325 of the planet gear. However, in a similar manner, a protrusion 5 can be formed at the rearward face side 326 of the planet gear.

Further, it is pointed out that, in embodiments, the planet gear 32 is formed fully symmetrically and comprises, accordingly, a protrusion 5 and a recess 320 both at the axially forward face side and at the axially rearward face side of the planet gear. Further, the planet gear 32 may be fully symmetrical in the circumferential direction, in which case the protrusion 5 extends over 360° in the circumferential direction.

It should be understood that the above description is intended for illustrative purposes only, and is not intended to limit the scope of the present disclosure in any way. Also, those skilled in the art will appreciate that other aspects of the disclosure can be obtained from a study of the drawings, the disclosure and the appended claims. All methods described herein can be performed in any suitable order unless otherwise indicated herein or otherwise clearly contradicted by context. Various features of the various embodiments disclosed herein can be combined in different combinations to create new embodiments within the scope of the present disclosure. In particular, the disclosure extends to and includes all combinations and sub-combinations of one or more features described herein. Any ranges given herein include any and all specific values within the range and any and all sub-ranges within the given range.

We claim:

1. A planetary gearbox comprising:
a sun gear which is configured to rotate about a rotational axis of the planetary gearbox, the rotational axis defining an axial direction of the planetary gearbox;
a plurality of planet gears which are driven by the sun gear, each planet gear comprising an inner bore, an axially forward face side and an axially rearward face side;
a ring gear, the planet gears meshing with the ring gear; and
a plurality of journal bearing pins, each of the journal bearing pins being located in an inner bore of one of the planet gears, wherein in each case a journal bearing pin and a planet gear form a journal bearing;
wherein at its axially forward face side and/or at its axially rearward face side, each planet gear forms a recess that extends towards a mid-plane of the planet gear;
wherein the planet gear forms a protrusion at its axially forward face side and/or at its axially rearward face side, the protrusion having an axial extent and a radial extent, wherein the radial extent is limited at the respective face side to the area between the planet gear inner bore and the radial inner limit of the respective recess in the planet gear, and wherein the protrusion is configured to provide for a flow path for oil emerging from the journal bearing that guides the oil away from the journal bearing in a direction having an axial component;
wherein the protrusion has a radially inner underside, a radially outer top side, and an axially outer end forming a transition between the underside and the top side, wherein the underside of the protrusion provides for an initial flow path of the oil emerging from the journal bearing; and
wherein the underside of the protrusion comprises a sloped surface extending at an angle with respect to the axial direction.

2. The planetary gearbox of claim 1, wherein the underside of the protrusion comprises two sloped surfaces, a first sloped surface adjacent to the journal bearing and a second sloped surface adjacent to the first sloped surface, wherein the first sloped surface is more angled with respect to the axial direction than the second sloped surface.

3. The planetary gearbox of claim 2, wherein the first sloped surface extends, in a sectional view of the planet gear, at an angle (α) to the axial direction which lies in the range between 30° and 60°, and in that the second sloped surface extends, in a sectional view of the planet gear, at an angle (β) to the axial direction which lies in the range between 5° and 25°.

4. The planetary gearbox of claim 1, wherein the underside of the protrusion is formed by a single sloped surface, wherein the single sloped surface extends at an angle (α) to the axial direction which lies in the range between 30° and 60°.

5. The planetary gearbox of claim 1, wherein the axially outer end of the protrusion forms an oil separation edge for separating oil from the planet gear.

6. The planetary gearbox of claim 1, wherein the axially outer end of the protrusion is in the form of a hook-like projection that extends in a radially outward direction, the hook-like projection comprising an outer surface that extends radially.

7. The planetary gearbox of claim 6, wherein the hook-like projection forms a top surface which extends at right angles to the radially extending outer surface of the projection, wherein the top surface and the radially extending outer surface form an oil separation edge.

8. The planetary gearbox of claim 7, wherein the top side of the protrusion comprises a groove configured to collect residual oil that has passed around the axially outer end of the protrusion, and wherein the groove comprises a groove side wall that runs perpendicular to the top surface of the hook-like projection, wherein the top surface and the groove side wall form an oil separation edge.

9. The planetary gearbox of claim 1, wherein the top side of the protrusion comprises a groove configured to collect residual oil that has passed around the axially outer end of the protrusion.

10. The planetary gearbox of claim 1, wherein the underside of the protrusion comprises a sloped surface and an axially extending surface, wherein the sloped surface is adjacent the journal bearing.

11. The planetary gearbox of claim 10, wherein the protrusion forms, in sectional view, a rectangular structure.

12. The planetary gearbox of claim 1, wherein the underside of the protrusion comprises an inner groove that is formed adjacent a sloped surface, wherein the sloped surface is formed adjacent the journal bearing.

13. The planetary gearbox of claim 12, wherein the axially outer end of the protrusion is formed by a radially inward pointing hook, wherein the hook is adjacent the inner groove.

14. The planetary gearbox of claim 1, wherein the recess at the axially forward face side and/or the recess at the axially rearward face side comprises a radially outer surface that is inclined at an angle ($\gamma$) larger than 0° with respect to the axial direction.

15. The planetary gearbox of claim 1, wherein the protrusion extends over 360° in the circumferential direction of the planet gear.

16. A gas turbine engine comprising:
an engine core comprising a turbine, a compressor, and a core shaft connecting the turbine to the compressor;
a fan located upstream of the engine core, the fan comprising a plurality of fan blades; and a planetary gearbox of claim 1 that receives an input from the core shaft and outputs drive to the fan so as to drive the fan at a lower rotational speed than the core shaft.

* * * * *